Aug. 6, 1968   M. V. BODNARESCU   3,396,077
MANUFACTURE OF RADIO-ISOTOPES

Filed Sept. 14, 1966   2 Sheets-Sheet 1

INVENTOR
Musat V. BODNARESCU

BY
*Raymond A. ...*

ATTORNEY

Aug. 6, 1968 M. V. BODNARESCU 3,396,077
MANUFACTURE OF RADIO-ISOTOPES
Filed Sept. 14, 1966 2 Sheets-Sheet 2

INVENTOR
Musat V. BODNARESCU
BY
Raymond A. …
ATTORNEY

United States Patent Office 3,396,077
Patented Aug. 6, 1968

3,396,077
MANUFACTURE OF RADIO-ISOTOPES
Musat V. Bodnarescu, Mol-Donk, Belgium, assignor to European Atomic Energy Community (Euratom), Brussels, Belgium
Continuation-in-part of application Ser. No. 404,537, Oct. 16, 1964. This application Sept. 14, 1966, Ser. No. 579,414
Claims priority, application Belgium, Oct. 18, 1963, 512,159
4 Claims. (Cl. 176—15)

ABSTRACT OF THE DISCLOSURE

An irradiation capsule for use in a control rod of a nuclear reactor for the production of radioisotopes in epithermal and fast neutrons. The capsule comprises an outer tubular shield in which a target material is enclosed, the shield being closed at the ends thereof by stoppers. The lower stopper is provided with spacing members to center the capsule within the control rod and have them rest on a shoulder formed at the lower end of the control rod. These spacing members are retractable within the periphery of the lower stopper to allow removal of the capsule from the control rods. A pair of telescopic tubes are provided at the top of the capsule, the lower tube being secured to the upper stopper and the upper tube being provided with laterally projecting spacers intended to be pressed against a shoulder at the upper end of the control rod by means of a spring cooperatively mounted on the two telescopic tubes to move them away from one another.

---

This application is a continuation-in-part undiminished of my copending application U.S. Ser. No. 404,537 (Series of 1960), filed Oct. 16, 1964, now abandoned.

This invention relates to a device for the production of radio-isotopes, particularly those radio-isotopes the nuclei or intermediate nuclei of which are consumed too much by fission when exposed to normal in-pile irradiation.

In numerous fields such like medicine, metallurgy, petroleum industries, textile industries, the increasing importance of radio-isotopes is well known as is their use as a source of compact energy, particulary useful in cases where weight and volume are strictly limited.

These radio-isotopes are generally produced by irradiation inside a nuclear reactor: a material subjected to an appropriate neutronic bombardment undergoes changes which make it radioactive, that is, transform it into a radio-isotope.

This irradiation is made to take place either in the fuel channels of the reactor or in special easily accessible channels conceived for irradiation of encapsuled material.

Some radio-isotopes are generated by $(n,\gamma)$-reactions. These reactions lead to desired neutron capture, accompanied by the undesired competing fission process.

Especially when a nuclear reaction of higher order is in the case, where several neutrons (one after the other) have to be captured from the starting nucleus on, it is extremely important to keep the ratio of the cross sections capture/fission as high as possible. The increase of flux intensity with otherwise equal neutron energy spectrum does not change this ratio. Then an advantage exists only where the undesired side reaction is a natural decay process and not a fission process.

If one wants to influence the ratio capture/fission there is left only the way to choose an appropriate neutron spectrum.

For many nuclides the ratio capture/fission for irradiation in an epithermal neutron flux is increased by increasing neutron capture or by diminishing neutron-induced fission.

There may be chosen two possibilities for the irradiation of such nuclides in epithermal and fast neutron fluxes:

(a) An in-pile region with high epithermal neutron flux-component and non-exclusion of the thermal flux, and (b) Exclusion of thermal neutron flux by an appropriate absorber and irradiation in a purely epithermal neutron flux.

A simple way for irradiation with epithermal neutrons according to possibility (b) is the irradiation of the target substance in a cadmium capsule within the irradiation channel of a nuclear reactor. But a considerable disadvantage of this way is the unfavorable deformation of neutron flux distribution, whereby the neutron flux is diminished not only around the target itself but also no further irradiation may be undertaken in the vicinity of the irradiation channel in question. The fuel in this zone stays cold, no neutrons are produced and neutron economy is suffering badly.

It is an object of the present invention to provide a device widely adaptable to produce radio-isotopes in epithermal and fast neutron fluxes without the aid of means normally foreseen for the production of radio-isotopes like irradiation of capsules in irradiation channels, fuel elements or special radio-isotope production assemblies. It is a further object of the invention to provide a device for a high-yield production of radio-isotopes, the yield of which is low when produced by normal in-pile irradiation, due to fission induced nuclei consuming reactions.

Other objects and advantages of the invention will become apparent to those skilled in the art upon becoming familiar with the following description and claims, reference being made to the appended drawings.

This invention is based upon the idea to use and utilize the thermal-neutron-void interior of the absorber part of control means in normal nuclear reactor control systems for the production of radio-isotopes.

For the purpose of the specification and claims reactor control means are defined as means to control neutron density of a nuclear reactor by positioning mechanically absorber material or control material (nuclear fuels excepted) in the form of control rods, shim rods or shim bodies, in general: movable absorbers for thermal neutrons as they are used in reactor engineering for reactor control.

Reactor control means here do not comprise other means having an influence on the control of a nuclear reactor like fuel elements or reflectors being varied in their position, or targets to be irradiated in irradiation or fuel channels of a reactor.

FIGURE 1 of the appended drawings is a schematic sectional view through a multi-layer tube serving as a control rod.

Figure 1:
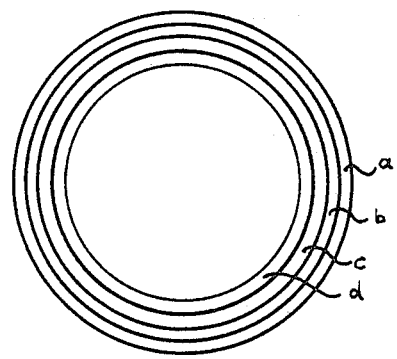

With reference to FIG. 1 the tube is canned on the inside $d$ and the outside $a$. Behind the outside canning layer

*a* is contained a thermal neutron absorber *b* serving as a transparent filter for epithermal and fast neutrons which are designed to impinge on the target material *c* in order to produce radio-isotopes therefrom.

Figure 3:
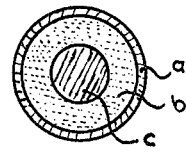
FIGURE 3 shows a modified absorber rod.
Figure 2:
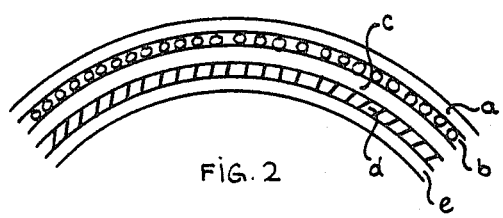
FIGURE 2 shows a schematic cross section through a multi-layer tube similar to the one shown in FIG. 1.

With reference to FIG. 2, *a* and *e* are outside and inside canning respectively, *c* being the thermal neutron absorber, *d* the target material to be irradiated, and *b* a layer of cobalt balls to be irradiated, as is already known. In FIG. 3, *a* is the outside canning layer (no inside canning being provided), *b* is a thermal neutron absorber and *c* is the target material contained in an axial cavity.

Figure 4:
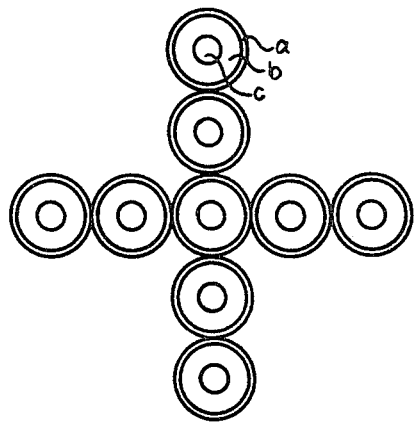
FIGURE 4 shows an in-pile arrangement of absorber rods as shown in FIG. 3.
Figure 5:
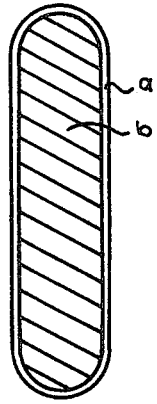
FIGURE 5 shows an absorber plate.

With reference to FIG. 4, *a*, *b*, and *c* have the same meaning as that indicated in reference to FIG. 3. In FIG. 5, *a* is the canning sheath and *b* either a mixture or an alloy or chemical compound of absorber material and target material.

Figure 6:
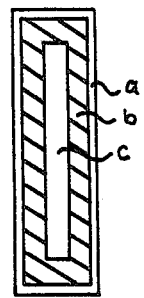
FIGURE 6 shows another absorber plate.

As to FIG. 6, *a* indicates the canning sheath, *b* the thermal neutron absorber layer and *c* an axial cavity filled with target material.

Figure 8:
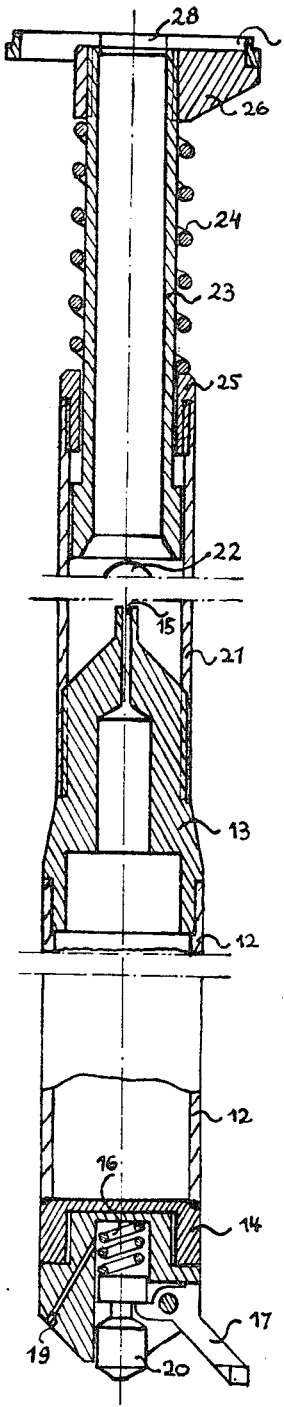
FIGURE 8 is a fragmentary sectional view of a capsule to be disposed inside the control rod FIG. 7 as shown in FIG. 9.
Figure 7:
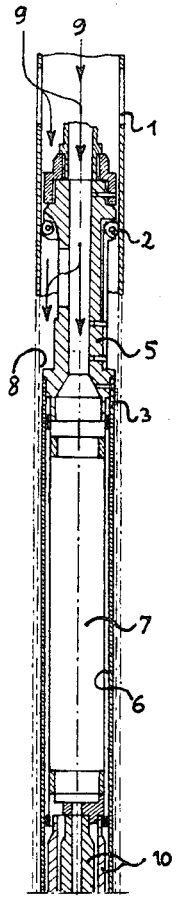
FIGURE 7 is a diagrammatic sectional view of a normal control rod.
Figure 9:
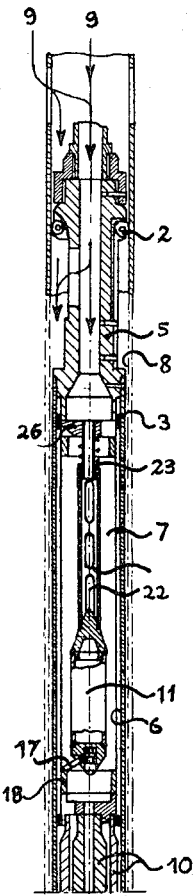

FIGS. 1 to 6 represent modifications of a prototypical embodiment of the invention, reference being had mainly to FIGS. 7 to 9, where FIG. 7 shows a sectional view of a typical control rod, particularly the in-core and near-core parts of it, the parts carrying drive, clutch, and positioning mechanisms being omitted as well as the shock absorber part.

In FIGS. 7 and 8 equal numbers design equal parts: 1 is an outer canning, provided with holes allowing passage of cooling fluid, within the outer canning is mounted slideably an elongated tube 3 provided with lower and upper connecting parts 4 and 5, respectively, 3 serving as a canning tube for the tube from absorber material 6, e.g., cadmium, normally sheathed with aluminium. Through the central space 7 and the circular clearance 8 cooling fluid 9 may pass and traverse also the concentric tubes of solid moderator material 10, as under reactor conditions considerable quantities of heat are produced by the absorption of thermal neutrons in the absorber material. Now in carrying out a preferred embodiment of the invention the irradiation capsule 11 shown in FIG. 8 is disposed in the central space 7 of FIG. 7 as shown in FIG. 9. The capsule as shown in FIG. 8 is composed of a capsule tube 12 provided with an upper, 13, and a lower, 14, stopper welded on the tube 12. The upper stopper 13 is provided with a narrow aperture 15 serving for filling tube 12 with a protective gas, which aperture 13 is closed before in-reactor use. The lower stopper 14 is conceived in a manner to permit spring 16 supported positioning of the laterally slideable member 17 on the shoulder 18 as shown in FIG. 9. The lower stopper 14 is provided with a pressure equalization aperture 19. When pressure is exerted mechanically from below on member 20, members 17 are released and the capsule 11 may be withdrawn from above after removal of the upper connection parts 5 and what is above. More specifically, the spacing members 17 are pressed resiliently against the inner wall of the absorber tube, pressure being exerted by the spring 16, transmitted over member 20. When pressure is exerted in axial direction on member 17, from above, the latter rotates clockwise towards the axis of the assembly and within the periphery of the lower stopper 14, allowing the capsule to be used in a narrow channel.

The upper stopper 13 carries, screwed upon it, a guiding tube 21 provided with elongated holes 22 permitting cooling fluid flow distribution inside of this guiding tube. On its upper end the tube 21 carries a terminal member 23, which is positioned, supported by spring 24, against a screwable nose 25. The terminal member 23 is carrying a triple flange 26, supported circular disc 27, which is positioned against the upper connection part 5 (FIG. 9) and provided with a central hole 28, serving as cooling fluid inlet. The target material is filled into the capsule 11, the capsule closed with the stopper 13 by welding, the welded joints examined by X-radiography, the atmosphere inside the capsule 11 replaced by protective gas atmosphere through 15 and closed by welding. Then the guiding tube 21 is screwed upon the stopper 13 and the whole capsule positioned within the control rod, the connection piece 5 introduced together with drive, clutch, and positioning mechanisms usually foreseen for the control rod.

An example, explaining the advantages of the invention is the production of Beryllium-10 carrier free through irradiation of Boron-10 in the epithermal-fast flux of a reactor.

If the thermal neutron flux component was not eliminated, Boron-10 with a cross section of 3820 barn would be consumed by the thermal neutrons through a nuclear reaction furnishing helium and lithium. For that reason, when Boron-10 is irradiated in the device according to the invention, Beryllium-10 is furnished through a (n,p)-reaction. The Beryllium-10 is carrierfree, when there was no beryllium contained in the target.

Another example is the irradiation according to the invention of Curium-244 for the intermediate production of Curium-246, from which, as a new starting material through irradiation in the total flux of a reactor, one obtains in nuclear reactions leading over curium and berkelium isotopes the appreciated californium.

Here, the first step Cm-244→Cm-246 has to be conducted under elimination of the thermal neutron flux in order to influence the unfavorable capture/fission ratio of Curium-245. The essential advantage of the device lies in the fact that no conventional irradiation device is irradiation channels are needed but only better use is made of reactor control means already present in any reactor whatever may be its conception. Through the device according to the invention normal flux distribution and flux intensity is not in the slightest way influenced, as is the case when working with thermal neutron absorbing capsules in irradiation channels.

The most elegant case is that explained as a prototypical embodiment of the invention: a capsule placed within the hollow thermal neutron absorbing cadmium tube of a conventional control rod.

Yet the control means for nuclear reactors are often different of the type shown: there are massive bars in rod form, there are control bodies having other forms like balls, which are technologically controlled and moved automatically to control neutron flux distribution and neutron flux density. So the device according to the invention may have different geometrical forms, the axial cavity inside a Cadmium like absorber material may be filled with target material as is shown in FIG. 3. Varying forms are shown too in FIG. 6, where the section is of parallel-epipedic form, and in FIG. 5 where an elongated section form is filled with a powder mixture or an alloy or a chemical compound of control material and target material.

Thus *b* in FIG. 5 may represent a powder mixture of Cadmium and Boron-10, or a Cadmium-Curium-244 alloy.

An advantageous modification of the invention is the exposition of the target material to be irradiated to the epithermal and fast neutron flux behind the shield of control material within technologically employed nuclear reactor control means, such target material being wrapped in or alloyed with material serving as a filter for the epithermal and fast neutrons impinging on them and allowing only a certain desired energy range of neutrons to pass for which the capture cross section of the target material is optimal.

Such filter substances may be chosen from neutron spectrum catalogues according to the problem to be solved. The cavities of control rods may also be lined with filter materials. As in the case of the capsule irradiated in a water cooled cavity inside of a reactor control rod epithermal and fast neutrons are moderated by the cooling water, it is advisable to line the capsule with the control material employed in the rod or another one.

The advantages of the invention are remarkable from the point of view of economics, particulary in the case of the transplutoniums, i.e. elements having an atomic number greater than 94.

Literature: Reactor Handbook 2nd edition, volume I—Materials; volume IV—Engineering.

What I claim is:

1. In control means of nuclear reactors, the combination for the production of radioisotopes in epithermal and fast neutrons, comprising:
   (a) a hollow neutron absorbing control rod and shoulder means at the ends of said rod;
   (b) an irradiation capsule within said rod, between the ends thereof, of a cross-section to be loosely received therein; said capsule comprising:
      an outer tubular shield,
      a target material enclosed by said shield, and stoppers closing the ends of said tubular shield;
   (c) spacing members mounted on the lower one of said shield stoppers, said spacing members laterally projecting from said lower stopper and shield to rest against the lower one of said control rod shoulder means;
   (d) means allowing said spacing members to retract within the periphery of said lower stopper to allow removal of said capsule from said control rod;
   (e) guiding means for said capsule formed of telescopic upper and lower members, said lower member secured to the upper one of said shield stoppers and said upper member provided with spacing means to center said capsule in said control rod, and
   (f) resilient means between said telescopic members to press said spacing means against the upper one of said control rod shoulder means.

2. A combination as claimed in claim 1 wherein said shield is lined with neutron filter material capable of selecting optimal neutron energy ranges from the epithermal and fast neutrons to impinge on the target material.

3. A combination as claimed in claim 2 wherein said target material is a powder mixture.

4. A combination as claimed in claim 2 wherein said target material is an alloy.

References Cited

UNITED STATES PATENTS

| | | | |
|---|---|---|---|
| 2,743,226 | 4/1956 | Newson | 176—15 |
| 3,042,598 | 7/1962 | Crowther | 176—93 |
| 3,049,484 | 8/1962 | Zinn | 176—15 |
| 3,052,616 | 9/1962 | Graham | 176—21 |
| 3,103,479 | 9/1963 | Ransohoff | 176—93 |
| 3,138,534 | 6/1964 | Frisch et al. | 176—15 |
| 3,250,729 | 5/1966 | Petzow et al. | 176—93 |
| 3,255,092 | 6/1966 | Dee | 176—93 |
| 3,269,915 | 8/1966 | Ransohoff et al. | 176—16 |

FOREIGN PATENTS 934,343 8/1963 Great Britain.

CARL D. QUARFORTH, *Primary Examiner.*

H. E. BEHREND, *Assistant Examiner.*